(12) United States Patent
Chou et al.

(10) Patent No.: US 10,308,999 B2
(45) Date of Patent: Jun. 4, 2019

(54) IRON-BASED ALLOY COATING AND METHOD FOR MANUFACTURING THE SAME

(71) Applicant: INDUSTRIAL TECHNOLOGY RESEARCH INSTITUTE, Hsinchu (TW)

(72) Inventors: Li-Shing Chou, Tainan (TW); Yen-Yu Hou, Tainan (TW); Chih-Chao Yang, Tainan (TW); Yi-Tsung Pan, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 795 days.

(21) Appl. No.: 14/974,127

(22) Filed: Dec. 18, 2015

(65) Prior Publication Data

US 2017/0159156 A1 Jun. 8, 2017

(30) Foreign Application Priority Data

Dec. 3, 2015 (TW) .............................. 104140490 A

(51) Int. Cl.
| | | |
|---|---|---|
| C22C 33/00 | (2006.01) | |
| C22C 38/02 | (2006.01) | |
| C23C 4/06 | (2016.01) | |
| C23C 4/08 | (2016.01) | |
| C22C 38/32 | (2006.01) | |
| C23C 4/131 | (2016.01) | |
| C23C 4/134 | (2016.01) | |
| C23C 4/137 | (2016.01) | |
| B23K 26/354 | (2014.01) | |
| C22C 38/22 | (2006.01) | |
| C22C 33/02 | (2006.01) | |
| C22C 38/00 | (2006.01) | |
| C23C 4/18 | (2006.01) | |
| B23K 26/00 | (2014.01) | |
| B23K 101/34 | (2006.01) | |
| B23K 103/04 | (2006.01) | |

(52) U.S. Cl.
CPC ........ *C22C 33/003* (2013.01); *B23K 26/0006* (2013.01); *B23K 26/354* (2015.10); *C22C 33/0207* (2013.01); *C22C 33/0285* (2013.01); *C22C 38/005* (2013.01); *C22C 38/02* (2013.01); *C22C 38/22* (2013.01); *C22C 38/32* (2013.01); *C23C 4/06* (2013.01); *C23C 4/08* (2013.01); *C23C 4/131* (2016.01); *C23C 4/134* (2016.01); *C23C 4/137* (2016.01); *C23C 4/18* (2013.01); *B23K 2101/34* (2018.08); *B23K 2103/04* (2018.08)

(58) Field of Classification Search
CPC ....... C22C 38/02; C22C 33/00; C22C 33/003; C22C 38/22; C22C 38/32; B23K 26/354; C23C 4/06; C23C 4/08; C23C 4/131; C23C 4/134; C23C 4/137
USPC ......................................................... 148/325
See application file for complete search history.

(56) References Cited

U.S. PATENT DOCUMENTS

| | | | |
|---|---|---|---|
| 4,653,500 A | 3/1987 | Osada et al. | |
| 4,965,139 A | 10/1990 | Kabacoff et al. | |
| 7,267,844 B2 | 9/2007 | Branagan | |
| 7,323,071 B1 | 1/2008 | Branagan | |
| 8,075,712 B2 | 12/2011 | Farmer | |
| 2006/0163217 A1* | 7/2006 | Jiang .................. | C23C 4/12 219/121.46 |
| 2007/0079907 A1 | 4/2007 | Johnson et al. | |
| 2007/0107809 A1 | 5/2007 | Farmer et al. | |
| 2007/0107810 A1 | 5/2007 | Farmer | |
| 2008/0041502 A1 | 2/2008 | Branagan | |
| 2008/0118387 A1 | 5/2008 | Demetriou et al. | |
| 2008/0248222 A1 | 10/2008 | Ohara et al. | |
| 2009/0320961 A1 | 12/2009 | Brunner | |
| 2010/0263766 A1 | 10/2010 | Saw et al. | |
| 2011/0056588 A9 | 3/2011 | Brunner | |
| 2011/0165348 A1 | 7/2011 | Farmer et al. | |
| 2012/0076946 A1 | 3/2012 | Farmer | |
| 2012/0156395 A1 | 6/2012 | Bilello | |
| 2013/0105300 A1 | 5/2013 | Jang et al. | |

(Continued)

FOREIGN PATENT DOCUMENTS

| | | |
|---|---|---|
| CN | 1088630 A | 6/1994 |
| CN | 1579681 A | 2/2005 |

(Continued)

OTHER PUBLICATIONS

Basu et al., "Laser surface coating of Fe—Cr—Mo—Y—B—C bulk metallic glass composition on AISI 4140 steel," Surface and Coatings Technology, vol. 202, 2008 (Available online Sep. 29, 2007), pp. 2623-2631.

(Continued)

*Primary Examiner* — Brian D Walck
(74) *Attorney, Agent, or Firm* — Birch, Stewart, Kolasch & Birch, LLP

(57) ABSTRACT

A method of manufacturing an iron-based alloy coating is provided, which includes (a) providing an iron-based alloy powder having a chemical formula of $Fe_aCr_bMo_cSi_dB_eY_f$, wherein $48 \le a \le 50$; $21 \le b \le 23$; $18 \le c \le 20$; $2 \le d \le 3$; $2 \le e \le 4$; and $0 < f \le 2$. The method also includes step (b) thermal spraying the iron-based alloy powder to form an amorphous iron-based alloy coating, and step (c) laser re-melting the amorphous iron-based alloy coating, wherein the iron-based alloy coating is densified and remains amorphous.

9 Claims, No Drawings

(56) References Cited

U.S. PATENT DOCUMENTS

| | | | |
|---|---|---|---|
| 2014/0007991 | A1 | 1/2014 | Demetriou et al. |
| 2014/0065316 | A1 | 3/2014 | Cheney et al. |

FOREIGN PATENT DOCUMENTS

| | | | |
|---|---|---|---|
| CN | 200533767 | A | 10/2005 |
| CN | 1730714 | A | 2/2006 |
| CN | 1767905 | A | 5/2006 |
| CN | 101323951 | A | 12/2008 |
| CN | 2009-24256 | A | 2/2009 |
| CN | 101492794 | A | 7/2009 |
| CN | 101768718 | A | 7/2010 |
| CN | 101899663 | A | 12/2010 |
| CN | 101705443 | B | 5/2011 |
| CN | 102041467 | A | 5/2011 |
| CN | 102251204 | A | 11/2011 |
| CN | 1997765 | B | 5/2012 |
| CN | 101698903 | B | 7/2012 |
| CN | 102534435 | A | 7/2012 |
| CN | 102650027 | A | 8/2012 |
| CN | 102779575 | A | 11/2012 |
| CN | 102859024 | A | 1/2013 |
| CN | 103526135 | A | 1/2014 |
| CN | 104164641 | A | 11/2014 |
| CN | 104233119 | A | 12/2014 |
| CN | 104582877 | A | 4/2015 |
| CN | 103088272 | B | 5/2015 |
| CN | 105088108 | A | 11/2015 |
| TW | 388039 | B | 4/2000 |
| TW | 555609 | B | 10/2003 |
| TW | I268289 | B | 12/2006 |
| TW | I298657 | B | 7/2008 |
| TW | 201122125 | A1 | 7/2011 |
| TW | 201225115 | A1 | 6/2012 |
| TW | 201237186 | A1 | 9/2012 |
| TW | I434944 | B | 4/2014 |
| TW | I448559 | B | 8/2014 |
| TW | 201435099 | A | 9/2014 |
| TW | I452146 | B | 9/2014 |
| TW | I452147 | B | 9/2014 |
| WO | WO 2007/120207 | A2 | 10/2007 |
| WO | WO 2008/054366 | A3 | 5/2008 |
| WO | WO 2008/063891 | A3 | 5/2008 |

OTHER PUBLICATIONS

Chokethawai et al., "Microstructure evolution and thermal stability of an Fe-based amorphous alloy powder and thermally sprayed coatings," Journal of Alloys and Compunds, vol. 480, 2009 (Available online Feb. 23, 2009), pp. 351-359.

Farmer et al., "Corrosion resistance of thermally sprayed high-boron iron-based amorphous-metal coatings: FE49.7CR17.7Mn1.9W1.6B15.2C3.8Si2.4," J. Mater. Res., vol. 22, No. 8, Aug. 2007, pp. 2297-2311.

Guo et al., "Study of structure and corrosion resistance of Fe-based amorphous coatings prepared by HVAF and HVOF," Corrosion Science, vol. 53, 2011(available online Dec. 30, 2010), pp. 2351-2356.

Hofmann, "Bulk Metallic Glasses and Their Composites: A Brief History of Diverging Fields," Journal of Materials, vol. 2013, 2013, pp. 1-9.

Hu et al., "The corrosion and oxidation behavior of Zr-based metallic glasses," J. Mater. Res. vol. 29, No. 11, Jun. 14, 2014, pp. 1248-1255.

Milanti et al., "Microstructure! Characteristics and Tribological Behavior of HVOF-Sprayed Novel Fe-Based Alloy Coatings," Coatings, vol. 4, 2014, pp. 98-120.

Ni et al., "High performance amorphous steel coating prepared by HVOF thermal spraying," Journal of Alloys and Compounds, vol. 467, 2009, pp. 163-167.

Ponnambalam et al., "Synthesis of iron-based bulk metallic glasses as nonferromagnetic amorphous steel alloys," Applied Physics Letters, vol. 83, No. 6, Aug. 11, 2003, pp. 1131-1133.

Zhou et al., "Formation and corrosion behavior of Fe-based amorphous metallic coatings by HVOF thermal spraying," Surface and Coatings Technology, vol. 204, 2009 (available online Aug. 29, 2009), pp. 563-570.

Taiwanese Notice of Allowance and Search Report for Taiwanese Application No. 104140490, dated Mar. 21, 2016.

Chinese Office Action and Search Report issued in Chinese Application No. 201510959945.0 dated Dec. 28, 2017.

Ma et al., "Research Progress of Fe-based Amorphous Alloy Materials Prepared by Thermal Spraying," Rechuli Jishu Yu Zhuangbei, vol. 36, No. 4, Aug. 2015, pp. 22-26, with English abstract.

Zhang et al., "Research Progress of Fe-based Amorphous Alloy Coating Prepared by Thermal Spraying," Material & Heat Treatment, Hot Working Technology, vol. 39, No. 6, Mar. 2010, pp. 89-93, with English abstract.

* cited by examiner

IRON-BASED ALLOY COATING AND METHOD FOR MANUFACTURING THE SAME

CROSS REFERENCE TO RELATED APPLICATIONS

The present application is based on, and claims priority from, Taiwan Application Serial Number 104140490, filed on Dec. 3, 2015, the disclosure of which is hereby incorporated by reference herein in its entirety.

TECHNICAL FIELD

The technical field relates to an iron-based alloy coating, and in particular it relates to a method of manufacturing the iron-based alloy coating.

BACKGROUND

Normal injection screws, steel rollers, and other kinds of rotational equipment (e.g. impellers, turbines, or pumps) are run at high pressure, high mechanical torsion, high friction, and highly corrosive conditions. As such, the surface of the screw or impeller should be treated (e.g. ion nitriding or metal spraying) to improve its endurance. The injection screw material is usually alloy steel containing aluminum, chromium, and molybdenum such as SACM645, SKD61, and the like. The injection screw may have a hardness Hv of greater than 800 after nitriding, which can be utilized as plastic plasticizer screws and plastic melting barrels of a general piping set due to its excellent abrasion resistance. However, the above material has a poor corrosion resistance. A ceramic material (e.g. TiN or CrN) can be coated on the screws or the other rotational equipment by persons with ceramic coating skills (e.g. CVD) to improve the corrosion resistance of the above material. Although the ceramic material has high hardness and corrosion resistance, the ceramic material and a metal substrate have a poor bonding strength therebetween. In addition, the ceramic material is brittle, and it easily suffers cracking and peeling after being used for a period of time.

Accordingly, a novel coating for overcoming the above problem is called for.

SUMMARY

One embodiment of the disclosure provides an iron-based alloy coating, having a composition of: $Fe_aCr_bMo_cSi_dB_eY_f$, wherein 48≤a≤50; 21≤b≤23; 18≤c≤20; 2≤d≤3; 2≤e≤4; and 0<f≤2, wherein the iron-based alloy coating is amorphous and has a porosity of less than 0.5%.

One embodiment of the disclosure provides a method of manufacturing an iron-based alloy coating, comprising: (a) providing an iron-based alloy powder having a chemical formula of $Fe_aCr_bMo_cSi_dB_eY_f$, wherein 48≤a≤50; 21≤b≤23; 18≤c≤20; 2≤d≤3; 2≤e≤4; and 0<f≤2; (b) thermal spraying the iron-based alloy powder to form an amorphous iron-based alloy coating; and (c) laser re-melting the amorphous iron-based alloy coating, wherein the iron-based alloy coating is densified and remains amorphous.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment provides a method of manufacturing an iron-based alloy coating, which includes step (a) providing an iron-based alloy powder with a composition of $Fe_aCr_bMo_cSi_dB_eY_f$, wherein 48≤a≤50, 21≤b≤23, 18≤c≤20, 2≤d≤3, 2≤e≤4, and 0<f≤2. Note that a, b, c, d, e, and f mean atomic ratios. If the above element ratio of a, b, c, d, or e is greater than or less than the corresponding ratio, a crystalline phase of inter metallic compound is easily formed. In one embodiment, the iron-based alloy powder is formed by the following steps. Elements of corresponding ratios are weighed, mixed, and melted to form an iron-based master alloy. The iron-based master alloy is then melted in a vacuum, and then impacted with high-pressure gas to be vaporized. After the vaporized iron-based master alloy is cooled, an iron-based alloy powder is obtained. In one embodiment, the iron-based alloy powder has a diameter of 25 μm to 60 μm. An iron-based alloy powder that is too small can easily aggregate and cause blockages when it is being fed during the step of thermal spraying. Moreover, powder that is too small easily drift. An iron-based alloy powder that is too big can likewise cause blockages when it is being fed during the step of thermal spraying. Moreover, powder that is too big cannot melt completely, thereby negatively influencing the density of the coating formed by the thermal spray.

Thereafter, step (b) thermal sprays the iron-based alloy powder to form an amorphous iron-based alloy coating. In one embodiment, step (b) includes melting the iron-based alloy powder with an electric arc, and then spraying the melted iron-based alloy powder onto a substrate using a gas mixture of argon and hydrogen. In one embodiment, the electric arc had a current of 550 A to 650 A, and a voltage of 60V to 80V. An electric arc with an overly low current or voltage has a temperature that is too low to melt the iron-based alloy powder. An electric arc with an overly high current or voltage heats the powder too much, and the melted powder cannot solidify after contacting the substrate. In one embodiment, the argon flow is between 40 L/min and 60 L/min, and the hydrogen flow is between 10 L/min and 20 L/min. An overly low argon flow cannot efficiently blow and feed the powder. An overly high argon flow blows and feeds the powder too fast, such that the powder cannot be melted. An overly low hydrogen flow causes an overly low reaction temperature. An overly high hydrogen flow causes an overly high reaction temperature. In one embodiment, amount of iron-based alloy powder in the powder feeding is between 10 g/min and 20 g/min. An overly low iron-based alloy powder feeding amount cannot supply sufficient powder, thereby forming a coating with a low degree of density. An overly high iron-based alloy powder feeding amount cannot sufficiently melt the powder, thereby consuming too much powder. In one embodiment, the substrate can be S45C, SACM645, 304, or 316 stainless substrate. In one embodiment, the thermal spraying forms an amorphous iron-based alloy coating with a thickness of 30 μm to 300 μm, a pore size greater than 2 μm, and a porosity of greater than 20%. In one embodiment, the amorphous iron-based alloy coating and the substrate have a bonding strength of 9500 psi to 10000 psi, and a corrosion current of $5\times10^{-5}$ $A/cm^2$ to $7\times10^{-5}$ $A/cm^2$. A lower corrosion current means a higher corrosion resistance.

Thereafter, step (c) re-melts the iron-based alloy coating by a laser beam, such that the coating is densified and remains amorphous. The laser re-melted amorphous iron-based alloy coating has a thickness of 30 µm to 300 µm, it means the laser re-melting step, almost not influencing the thickness of the iron-based alloy coating. After the laser re-melting step, the iron-based alloy coating has a pore size of less than 2 µm and a porosity of less than 0.5%. In one embodiment, the laser re-melting step utilizes a Nd-YAG laser beam with a laser power of 80 W to 150 W. An overly low laser power cannot re-melt the coating. An overly high power may transform the amorphous iron-based alloy coating to a crystalline coating, thereby reducing its corrosion resistance. In one embodiment, the laser scan rate is between 450 mm/s and 550 mm/s. An overly slow scan rate may form a crystalline structure due to the coating being heated for too long a time. An overly fast scan rate cannot efficiently re-melt the coating due to the coating being heated for too short a time. The depth of the iron-based alloy coating scanned by the laser bean is between 30 µm and 300 µm. An overly large depth of the iron-based alloy coating scanned by the laser cannot re-melt the total coating.

The amorphous iron-based alloy coating may replace the conventional crystalline coating material (e.g. steel nitride or super alloy) and ceramic material to achieve the requirements of high corrosion/abrasion resistance in the field of manufacturing injecting screws or other rotational equipment (e.g. impellers, turbines, or pumps). The amorphous iron-based alloy is free of a crystalline boundary (which easily causes local corrosion) and composition segregation, it has a higher corrosion resistance, and a higher uniformity of structure/composition than that of the crystalline alloy. The thermal spraying may coat the powder onto a work piece surface to be modified, thereby forming metallurgy bonding therebetween to improve the bonding strength of the amorphous coating and the work piece. The laser re-melting step may densify the amorphous iron-based alloy coating and keep its amorphous structure.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

According to the following atomic ratios, 5 kg elements of Cr (23%), Fe (50%), Si (2%), Mo (20%), and B (3%) were weighed. The elements were mixed and then put into a closed vessel furnace. The furnace was then vacuumed to a pressure of about $10^{-2}$ torr, and then purged argon. The vacuum-purge cycles were repeated 5 times to ensure that the atmosphere in the furnace was clean. The mixture was then heated to about 1450° C. to be completely melted, and then stirred by an induced current to make the composition of the mixture uniform. After the heating of the mixture was stopped, the cooled product was an iron-based master alloy. An appropriate amount of the iron-based master alloy was re-melted in a vacuum (about $10^{-2}$ torr). When the melting alloy achieved a suitable temperature region (1500±20° C.), it was poured and impacted with a high-pressure gas to vaporize the melting alloy. The high-pressure gas had a pressure of about 25 bar and a flow of about 4.0 Nm³/min. The melting alloy was broken into tiny droplets by the high-pressure gas impact, and then cooled to form an alloy powder. The alloy powder had a crystalline structure, which was determined by XRD. As such, a further thermal spraying was not performed with the alloy powder.

Example 2

Example 2 was similar to Example 1, with the difference in Example 2 being that the element ratios were changed to the following: Cr (23%), Fe (49%), Si (2%), Mo (20%), B (3%), and Y (2%). The processes of melting, re-melting, and vaporization was similar to that in Example 1, and the description thereof is omitted here. The alloy powder had an amorphous structure, which was determined by XRD. After being sieved, the alloy powder with an average diameter of 53 µm (between 30 µm and 70 µm) was selected for a further step of thermal spraying.

Example 3

Example 3 was similar to Example 1, with the difference in Example 3 being that the element ratios were changed to the following: Cr (22%), Fe (48%), Si (2%), Mo (20%), B (3%), and Y (4%). The processes of melting, re-melting, and vaporization was similar to that in Example 1, and the description thereof is omitted here. The alloy powder had a crystalline structure, which was determined by XRD. As such, a further thermal spraying was not performed with the alloy powder.

Example 4

The amorphous alloy powder in Example 2 was selected to prepare an amorphous iron-based alloy coating by thermal spraying equipment Plasma Tech A-3000. The powder was melted with an electric arc (with a current of 600 A and a voltage of 73V), and then spray coated onto a S45C substrate using a gas mixture of argon with a flow of 45 L/min and hydrogen with a flow of 11 L/min). As such, an amorphous iron-based alloy coating was formed on the substrate. The S45C substrate had a composition of C (0.45%), Si (0.28%), Mn (0.75%), and Fe (Bal.). The amorphous iron-based alloy coating had a thickness of 100 µm. The amorphous iron-based alloy coating had a pore size greater than 2 µm and a porosity of greater than 20%, which were determined by SEM. The alloy coating had an amorphous structure, which was determined by XRD. The substrate and the amorphous iron-based alloy coating had a bonding strength of 10000 psi and a corrosion current of $5 \times 10^{-5}$ A/cm².

Example 5

The amorphous iron-based alloy coating in Example 4 was re-melted by a Nd-YAG laser beam to densify it, and the amorphous structure was kept. The laser beam had a power of 100 W and a scan rate of 500 mm/s. The depth of the amorphous iron-based alloy coating scanned by the laser beam was 30 µm. The laser re-melted amorphous iron-based alloy coating had a pore size of less than 2 µm and a porosity of less 0.5%, which were determined by SEM. The laser re-melted iron-based alloy coating remained an amorphous structure, which was determined by XRD. The substrate and the laser re-melted iron-based alloy coating had a bonding strength of 50000 psi and a corrosion current of $5 \times 10^{-6}$ A/cm².

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. An iron-based alloy coating, having a composition of: $Fe_aCr_bMo_cSi_dB_eY_f$, wherein $48 \leq a \leq 50$; $21 \leq b \leq 23$; $18 \leq c \leq 20$; $2 \leq d \leq 3$; $2 \leq e \leq 4$; and $0 < f \leq 2$, wherein the iron-based alloy coating is amorphous and has a porosity of less than 0.5%.

2. The iron-based alloy coating as claimed in claim 1, having a thickness of 30 μm to 300 μm.

3. The iron-based alloy coating as claimed in claim 1, having a pore size less than 2 μm.

4. A method of manufacturing an iron-based alloy coating, comprising:
   (a) providing an iron-based alloy powder having a chemical formula of $Fe_aCr_bMo_cSi_dB_eY_f$, wherein $48 \leq a \leq 50$; $21 \leq b \leq 23$; $18 \leq c \leq 20$; $2 \leq d \leq 3$; $2 \leq e \leq 4$; and $0 < f \leq 2$;
   (b) thermal spraying the iron-based alloy powder to form an amorphous iron-based alloy coating; and
   (c) laser re-melting the amorphous iron-based alloy coating, wherein the iron-based alloy coating is densified and remains amorphous.

5. The method as claimed in claim 4, wherein the iron-based alloy coating has a thickness of 30 μm to 300 μm after step (c).

6. The method as claimed in claim 4, wherein the iron-based alloy coating has a pore size less than 2 μm and a porosity of less than 0.5% after step (c).

7. The method as claimed in claim 4, wherein the iron-based alloy powder in step (a) has a diameter of 25 μm to 60 μm.

8. The method as claimed in claim 4, wherein thermal spraying the iron-based alloy powder in step (b) comprises melting the iron-based alloy powder using an electric arc, and then spraying the melted iron-based alloy powder onto a substrate using a gas mixture of argon and hydrogen.

9. The method as claimed in claim 4, wherein laser re-melting the amorphous iron-based alloy coating in step (c) utilizes a laser power of 80 W to 150 W, and a depth of the amorphous iron-based alloy coating scanned by a laser is between 30 μm and 300 μm.

* * * * *